United States Patent
Kondo

(10) Patent No.: US 6,717,477 B2
(45) Date of Patent: Apr. 6, 2004

(54) CIRCUIT FOR CONTROLLING A NON-CONDUCTIVE STATE OF A USB INTERFACE

(75) Inventor: Hideo Kondo, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/010,348

(22) Filed: Nov. 8, 2001

(65) Prior Publication Data

US 2002/0057134 A1 May 16, 2002

(30) Foreign Application Priority Data

Nov. 10, 2000 (JP) .................................. P2000-342845

(51) Int. Cl.[7] .............................................. H03B 5/20
(52) U.S. Cl. .............................................. 331/46; 710/8
(58) Field of Search .......................... 331/46, 49, 1 A, 331/17; 713/1, 2; 710/8, 10, 12, 63, 315

(56) References Cited

U.S. PATENT DOCUMENTS 6,178,513 B1 * 1/2001 Lee ............................. 713/300
6,205,502 B1 * 3/2001 Endo et al. .................. 710/100
6,351,809 B1 * 2/2002 St. Pierre et al. ............. 713/1
6,370,603 B1 * 4/2002 Silverman et al. ............ 710/72

FOREIGN PATENT DOCUMENTS

WO  WO 98/27482  6/1998

OTHER PUBLICATIONS

Korean Office Action dated May 29, 2003.

* cited by examiner

*Primary Examiner*—Robert Pascal
*Assistant Examiner*—Joseph Chang
(74) *Attorney, Agent, or Firm*—Fish & Richardson P.C.

(57) ABSTRACT

There are provided an output terminal P1 to be also used as a terminal to which a USB signal line is connected, a power-on reset circuit 80 for generating a reset signal RES in response to power supply from the USB signal line, and an RC oscillator 81 for starting oscillation immediately in response to the reset signal RES. The output of the RC oscillator 81 is used for a system clock to operate a microcomputer and to set the level of the output terminal P1. Consequently, USB signal lines 110 and 111 are forcibly set to a level in a non-connection state for a period before a USB interface circuit 30 can respond to a bus reset signal sent from a host.

11 Claims, 4 Drawing Sheets

US 6,717,477 B2

CIRCUIT FOR CONTROLLING A NON-CONDUCTIVE STATE OF A USB INTERFACE

BACKGROUND OF THE INVENTION

1. Field of the Invention

The present invention relates to a microcomputer comprising a USB interface circuit for interfacing data transmission and receipt between a host and the microcomputer through a USB signal line.

2. Description of the Related Art

In recent years, the support of a USB (Universal Serial Bus) has been started in order to increase the degree of freedom of extension of a peripheral device for a personal computer etc. The USB is a serial interface standard which are devised in consideration of the convenience of a user and can be used in common with a communication between various peripheral devices such as a keyboard, a mouse, a camera, a printer, a scanner or a speaker and a personal computer etc.

FIG. 4 is a diagram showing an example of the connecting structure of a personal computer and a peripheral device utilizing the USB. A higher level personal computer 100 and a hub 101 can be connected to each other through a USB cable, and furthermore, peripheral devices 102 to 105 can be connected to the lower level of the hub 101. The peripheral devices 102 to 105 are managed by the personal computer 100. Thus, the USB is a so-called bi-directional communicatable serial bus having a network structure of a multi-star type.

The USB cable includes four signal lines. Two of them are used for a power source and the others are used for a data signal. The data signal is basically handled as a differential signal ($D^+$, $D^-$). Moreover, data transfer utilizing the USB is subjected to time sharing on the concept that a transfer unit is a frame, and is carried out by superposing the frame.

One frame is started with an SOF (Start Of Frame) packet. The host personal computer sequentially transmits a data transfer request token (a data input request sent from a keyboard or a camera and a request for outputting voice data) scheduled within the started frame in advance, thereby carrying out data transfer together with a plurality of peripheral devices at the same time.

Examples of a document for technology of the USB include "Interface" (January, 1997) and JP-A-11-205412.

When the device is connected to the USB cable, the personal computer 100 recognizes a change in the state of the data signal line (a change of one of the two signal lines from a pull-down state to a pull-up state) and knows that the device is turned on. Then, the personal computer 100 issues a bus reset signal prior to a data communication. Upon receipt of the bus reset signal, the device carries out initialization within a constant time.

However, since a considerable time is required for the initialization, communication data transmitted after the issuance of the bus reset signal cannot be received on the device side. In the case of the microcomputer, particularly, the initialization is carried out by power-on reset when the power is turned on. In the process for the initialization, a considerable time is required before the operation of a quartz oscillator for generating a synchronous system clock corresponding to the USB is stabilized.

In the case in which the communication data are transmitted immediately after the personal computer 100 issues the bus reset signal, the communication data cannot be normally received because the system clock of the microcomputer 100 is unstable.

SUMMARY OF THE INVENTION

It is an object of the invention to provide a microcomputer comprising a USB interface capable of reliably receiving communication data also in the case in which a personal computer to be a host knows that the microcomputer is connected to a USB cable and transmits the communication data immediately after the issuance of a bus reset signal.

The invention provides a microcomputer comprising a USB interface circuit for interfacing transmission and receipt of data between a host and the microcomputer through a USB signal line, comprising state setting means for setting the USB signal line to a level in a non-connection state for a period before the USB interface circuit can respond to a bus reset signal sent from the host.

Also in the case in which the host knows that the microcomputer is connected to the USB signal line and transmits communication data immediately after the issuance of the bus reset signal, consequently, the communication data can be received reliably.

Moreover, the state setting means includes an output terminal to be also used as a terminal to which the USB signal line is connected, a reset signal generating circuit for generating a reset signal upon receipt of power supply from the USB signal line, and a first oscillator for starting oscillation immediately in response to the reset signal, and operates the microcomputer by using an output of the first oscillator as a system clock and sets a level of the output terminal, thereby forcibly setting the USB signal line to a level in a non-connection state.

According to such a structure, since the state can be set on a software basis by utilizing the function of the microcomputer, there is an advantage that a special timing circuit is not required. Moreover, there is provided the output terminal to be also used as the terminal to which the USB signal line is connected. Consequently, there is also an advantage that the output terminal can be utilized effectively.

Furthermore, the microcomputer further comprises a second oscillator serving to start oscillation in response to the reset signal and having a stabler oscillation frequency and a longer oscillation starting time than those of the first oscillator, and a selecting circuit for selecting one output from the first and second oscillators and outputting the selected output for a system clock, wherein the selecting circuit selects the output of the first oscillator in response to the reset signal and selects the output of the second oscillator after an oscillation state of the second oscillator is stabilized.

According to such a structure, the output of the first oscillator can be utilized for the system clock to set the state of the USB signal line before the oscillation state of the second oscillator is stabilized, and the second oscillator can be utilized as the system clock for a USB communication after the oscillation state of the second oscillator is stabilized.

DESCRIPTION OF THE PREFERRED EMBODIMENTS

Figure 1:
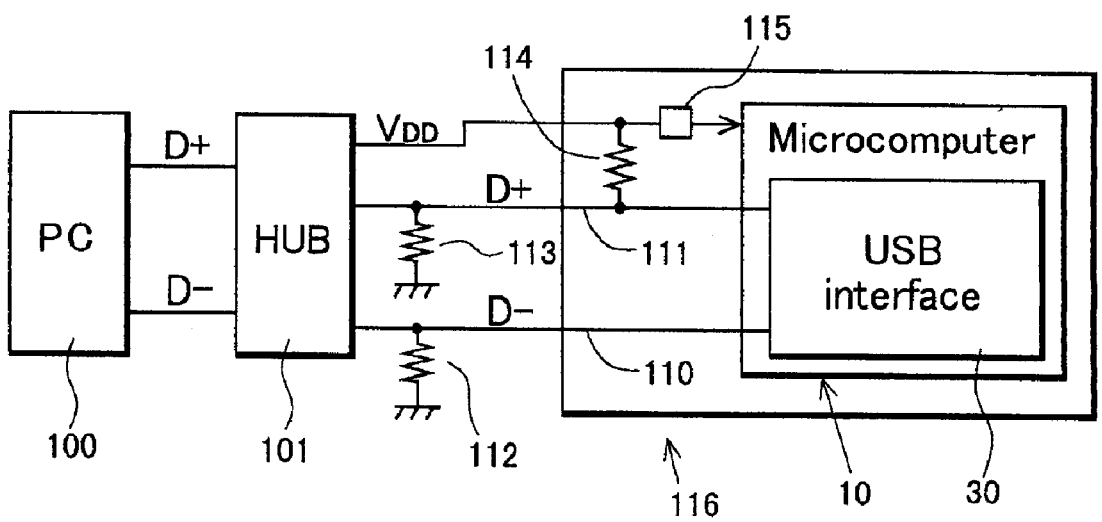
FIG. 1 is a diagram showing the whole structure of a USB system to which the invention is applied.

An embodiment of the invention will be described with reference to the drawings. FIG. 1 is a diagram showing the whole structure of a USB system to which the invention is applied. A personal computer 100 and a USB interface circuit 30 in the microcomputer 10 are connected to each other through a USB cable and a hub 101 is provided therebetween. A pair of USB signal lines 110 and 111 are pulled down through pull-down resistors 112 and 113.

When the USB cable is connected through a connector (not shown) to a substrate 116 having the microcomputer 10 mounted thereon, for example, one of the USB signal lines ($D^+$) is pulled up to a power potential VDD through a pull-up resistor 114 provided in the substrate 116 and a predetermined power potential (for example, 3.3 V) is supplied to the microcomputer 10 through a regulator 115.

Consequently, the personal computer 100 detects that the state of the USB signal line 111 is changed from a low level to a high level and knows that the USB cable is connected to the microcomputer 10. In other words, a pair of USB signal lines 110 and 111 serve as transmission paths for communication data, and furthermore, inform the personal computer 100 of the connection state of the device.

Moreover, a change in the state of the USB signal lines 110 and 111 simultaneously informs the personal computer 100 of the type of the device. More specifically, the device has a high speed if the USB signal line 110 is changed from the low level to the high level, and has a low speed if the USB signal line 111 is changed from the low level to the high level.

The personal computer 100 detecting the change in the state of the USB signal line 110 transmits a bus reset signal. On the other hand, the microcomputer 10 carries out initialization corresponding to the power ON. In the case in which the communication data are transmitted immediately after the bus reset signal, they cannot be normally received because a system clock is still unstable.

In the invention, the USB signal lines 110 and 111 are set to have a level in a non-connection state in the microcomputer 10. More specifically, although the USB signal lines 110 and 111 are connected to the microcomputer 10, the setting is carried out such that a change in the state of the USB signal line is not generated until the system clock is stabilized.

Figure 2:
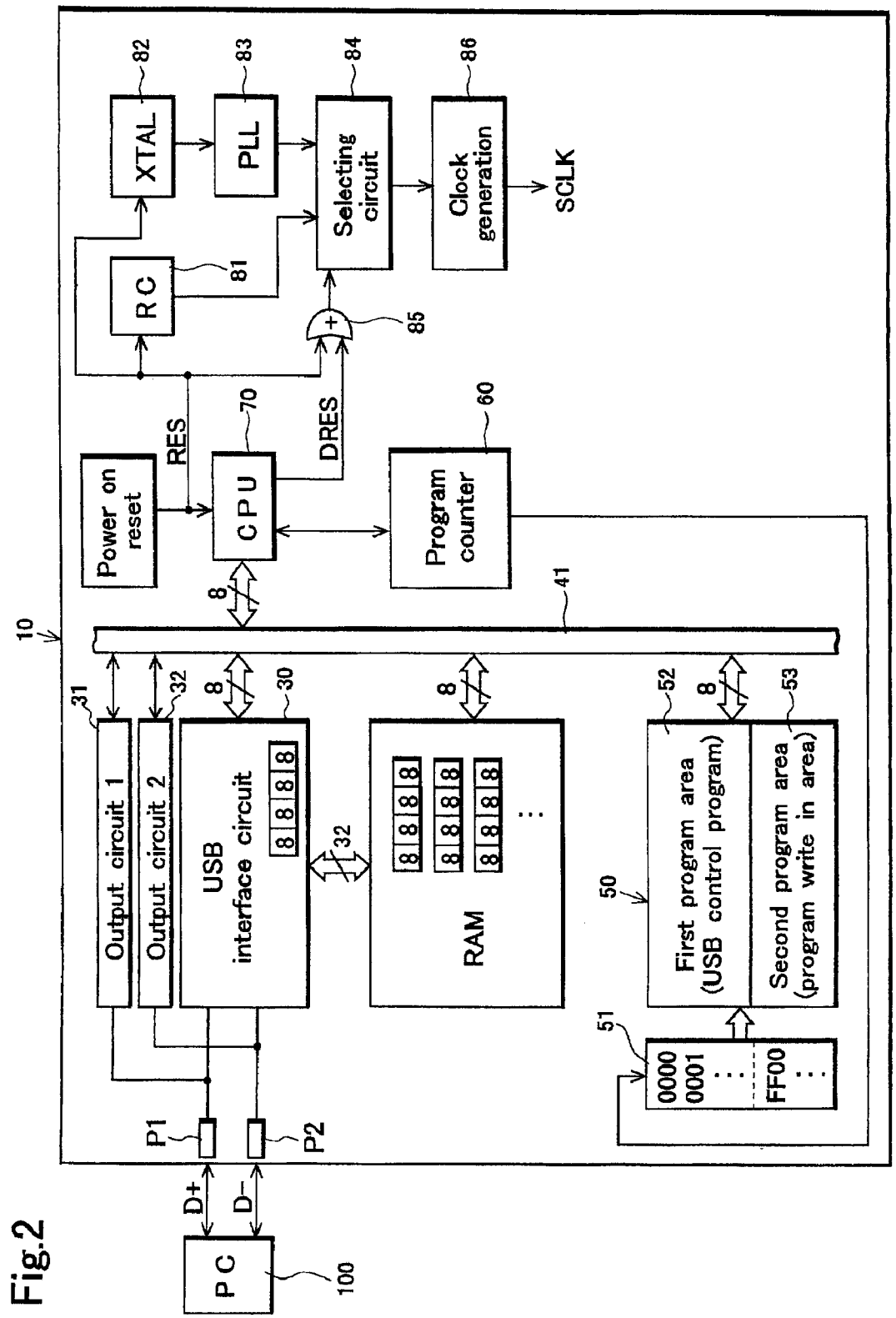
FIG. 2 is a block diagram showing a microcomputer according to an embodiment of the invention.

The structure of the microcomputer according to the embodiment of the invention will be described below in detail. FIG. 2 is a block diagram showing the structure of the microcomputer according to the embodiment of the invention. Assuming that the microcomputer 10 has an 8-bit structure, the description will be given.

As described above, the microcomputer 10 and the personal computer 100 are connected to each other through a pair of USB signal lines 110 and 111. Then, USB differential signals ($D^+$, $D^-$) on the USB signal lines 110 and 111 are input and output through terminals P1 and P2 of the microcomputer 10.

The USB interface circuit 30 provided in the microcomputer 10 serves to interface data transmission/receipt to/from the personal computer 100. During the data receipt, particularly, various data processings are carried out upon receipt of the USB differential signals ($D^+$, $D^-$) sent from an input/output circuit 20. The USB differential signals ($D^+$, $D^-$) are serial data signals complying with a USB communication protocol.

The USB interface circuit 30 extracts necessary data from the serial data signal. At this time, the USB interface circuit 30 decides the transfer format of the serial data signal and carries out an error signal processing, etc. Moreover, the USB interface circuit 30 converts a serial signal subjected to the data processing into a parallel signal having a predetermined format which can be processed by the microcomputer 10 (for example, an 8-bit structure).

Furthermore, the USB interface circuit 30 includes a temporary register 31 for temporarily storing program data having 8 bits×4=32 bits which are parallel converted, and a control register (not shown). Various data (address data to be allocated to the device, etc.) to be managed by the personal computer 100 as a host are set to the control register.

The terminals P1 and P2 also serve as the output terminal of the microcomputer. More specifically, a first output circuit 31 is connected to the terminal P1 and a second output circuit 32 is connected to the terminal P2, and a level can be set to the state of each of the terminals P1 and P2 on a software basis by the programming operation of the microcomputer.

A RAM 40 is utilized for temporarily storing program data having a 32-bit unit which are successively transferred from the data of the temporary register 31 of the USB interface circuit 30. In order to carry out the data transfer between the USB interface circuit 30 and the RAM 40, 32 dedicated signal lines are provided. When program data stored in the RAM 40 reach a predetermined amount (for example, 128 bytes), 128-byte program data are transferred through a bus 41 of the microcomputer 10 to a flash ROM 50 which will be described below.

To the contrary, the program data written to the flash ROM 50 can be transferred to the RAM 40 and the program data stored in the RAM 40 can be transferred to the temporary register 31 of the USB interface circuit 30.

The reference numeral 50 denotes a flash ROM which is divided into a first program area 53 in which a USB control program (more specifically, a write control program) is previously written and stored, and a second program area 52 to which program data transmitted from the personal computer 100 are written through the RAM 40. The flash ROM 50 is constituted by an electrical writable, readable and erasable EEPROM. Moreover, the "flash" implies that batch erasure can be carried out in a memory block unit.

The reference numeral 60 denotes a program counter and an output thereof is applied to an address decoder 51 of the flash ROM 50. The output value of the program counter 60 jumps to a predetermined address in response to an instruction sent from a CPU 70 according to the state of the USB communication as will be described later. More specifically, the program counter 60 jumps to an address (FF00) to be the starting address of the first program area (the write control program) when the program data reaching from the personal computer 100 are to be written, and jumps to an address (0000) to be the starting address of the second program area after the program data are written. Then, the CPU 70 executes the operation of the microcomputer 10 in accordance with a program instruction read from the flash ROM 50.

The reference numeral 80 denotes a power-on reset circuit which detects an increase in a power potential and generates a reset signal RES which rises to have a high level when the microcomputer 10 is turned on, and drops to have a low level when the power potential has a predetermined level.

The reference numeral 81 denotes an RC oscillator (a first oscillator) which directly starts oscillation in response to the reset signal RES. On the other hand, the reference numeral 82 denotes a quartz oscillator (a second oscillator) which starts oscillation in response to the reset signal RES. The quartz oscillator 82 has a very stable oscillation frequency and is suitable for the USB communication. However, the quartz oscillator 82 has such a property that an oscillation start time is comparatively long. Since the frequency of the quartz oscillator 82 is 32 KHz, it is converted into a synchronous clock of 6 MHz which is required for the USB communication by means of a PLL 83.

If a 6 MHz CF (Ceramic Filter) oscillator is used in place of the quartz oscillator 82, the PLL 83 is not required.

A selecting circuit 84 is a multiplexer for selecting and outputting one of the output of the RC oscillator 81 and the output of the quartz oscillator 82 in response to the output of an OR circuit 85. The reset signal RES and a delayed reset signal DRES sent from the CPU 70 are input to the OR circuit 85 (an adding circuit). The delayed reset signal DRES is obtained by delaying the reset signal RES sent from the power-on reset circuit 80, and maintains the high level for a constant period after the reset signal RES is reset to have the low level. More specifically, the selecting circuit 84 selects the output of the RC oscillator 81 when the output of the OR circuit 85 has the high level, and selects the output of the quartz oscillator 82 when the output of the OR circuit 85 has the low level.

Based on the output of the selecting circuit 84, moreover, a clock generating circuit 86 generates a plurality of system clocks SCLK required for operating the microcomputer 10.

Figure 3:
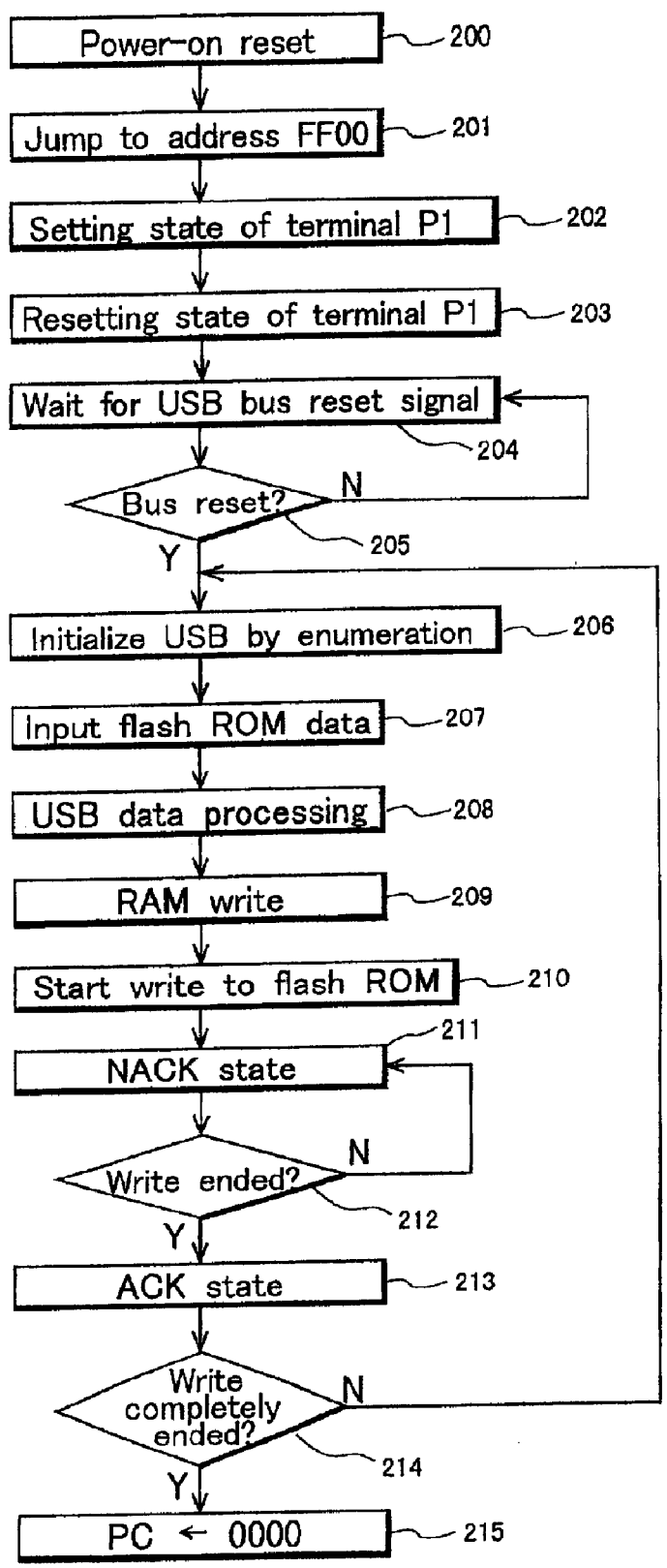
FIG. 3 is a flow chart showing an example of the operation of a microcomputer 10 according to the embodiment of the invention.
Figure 4:
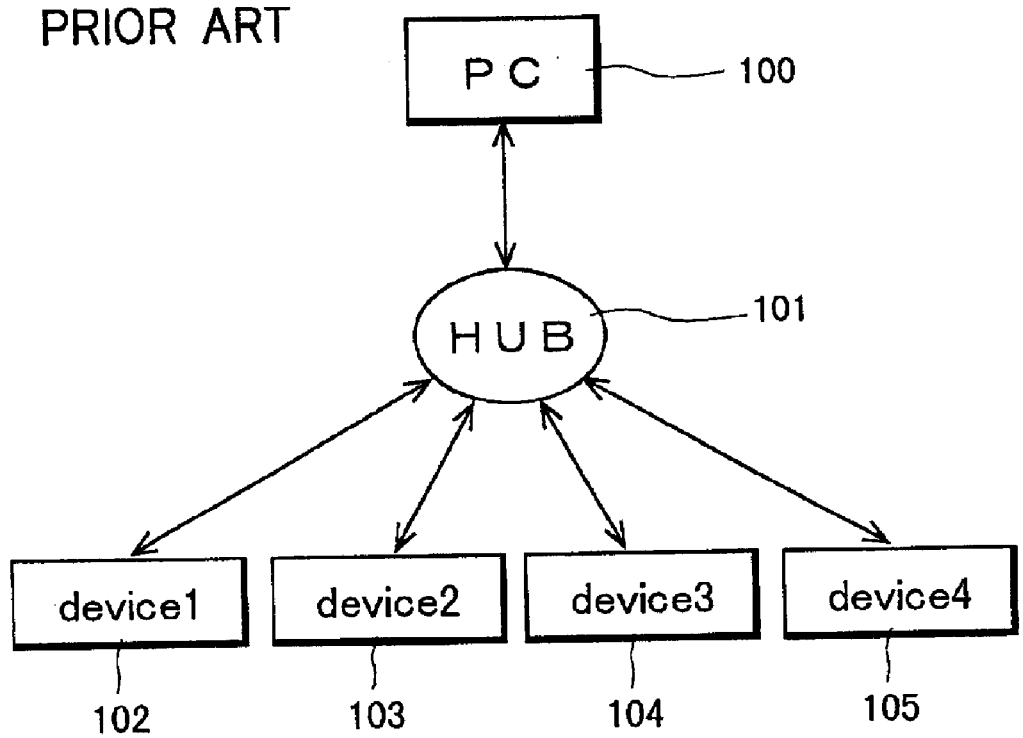
FIG. 4 is a diagram showing an example of the connecting structure of a personal computer and a peripheral device utilizing a USB.

Next, an example of the operation of the microcomputer 10 will be described with reference to a flow chart of FIG. 3. First of all, the microcomputer 10 is connected to the USB cable at a first step 200. At this time, the microcomputer 10 is turned on by the power line of the USB cable so that the power-on reset circuit 80 is operated and the reset signal RES (high level) is generated.

Consequently, the RC oscillator 81 immediately starts oscillation. At this time, the OR circuit 85 outputs the high level. As a result, the selecting circuit 84 selects the RC oscillator 81. Based on the oscillation output, a system clock SCLK is generated by the clock generating circuit 86. Then, the program counter 80 and the CPU 70 are started to be operated in response to the system clock SCLK.

First of all, at a step 201, the value of the program counter 60 jumps to the address (FF00) to be the starting address of the first program area (write control program). Accordingly, the microcomputer 10 then executes the following processing in accordance with the write control program.

At the step 202, the low level is output from the first output circuit 31 to the terminal P1. It is assumed that the first output circuit 31 has a sufficiently low impedance. Although the USB signal line 111 is pulled up at this time, it is forcibly set to the low level in response to the output having the low level of the first output circuit 31. Consequently, the personal computer 100 recognizes that the USB signal lines 110 and 111 are set in a non-connection state. For this reason, the bus reset signal is not issued in such a state.

A period for the forcible setting is defined by the reset signal RES and the delayed reset signal DRES sent from the CPU 70. The delayed reset signal DRES serves to maintain the selection state of the selecting circuit 40 (that is, a state in which the output of the RC oscillating circuit 81 is selected) for a predetermined period after the reset signal RES is generated. When the delay reset signal DRES is reset to have the low level, the selecting circuit 40 selects the output of the quartz oscillator 82. The predetermined period can be set in consideration of the oscillation stabilizing period of the quartz oscillator 82.

At a step 203, the first output circuit 31 is set to have a high impedance, so that the forcible setting state of the terminal P1 is reset. Consequently, since the USB signal lines 110 and 111 are changed into an original connection state, the personal computer 100 sends the bus reset signal after a predetermined period. Thus, the system clock of the microcomputer 10 can be stabilized before the bus reset signal is sent.

An operation for loading program data from the personal computer 100 to the microcomputer 10 will be described below.

At a step 204, the microcomputer 10 is in a USB bus reset signal waiting state.

At a step 205, it is decided whether or not the USB bus reset signal is received. If the decision is NO, the waiting state is maintained. If the decision is YES, the processing proceeds to a next step 206.

At the step 206, the initialization of the USB is carried out by enumeration. Here, the enumeration generally implies a series of software processings of setting an environment in which USB data can be transmitted and received between the microcomputer 10 and the personal computer 100.

A main processing to be carried out by the enumeration includes the initialization of the personal computer 100 and the allocation of an address to a device controlled by the personal computer 100. In the latter processing, a specific address allocated by the personal computer 100 is stored in a control register (an address register) in the USB interface circuit 30. Consequently, the microcomputer 10 collates an address in a USB packet transmitted from the personal computer 100 with an address in the address register. Only when they are coincident with each other, the USB data thus transmitted are processed.

When the environment in which the transmission and receipt of the USB data can be carried out is thus set completely, program data to be written to the flash ROM are input in the form of USB differential signal data ($D^+$, $D^-$) from the personal computer 100 at a step 207.

At a step 208, the USB differential signal data ($D^+$, $D^-$) thus input are subjected to a data processing by the USB interface circuit 30. The data processing has the contents described above and mainly includes a processing of converting serial data (8 bits×4) into predetermined parallel data (32 bits).

At a step 209, the program data parallel converted are written from the USB interface circuit 30 to the RAM 40. Then, when the amount of the program data written to the RAM 40 reaches a predetermined amount (for example, 128 bytes), write from the RAM 40 to the second program area of the flash ROM 50 through the internal bus 41 is started by using the predetermined amount as a unit (step 208). The flash ROM 50 is divided into a plurality of blocks and 128 bytes constitute each block. Accordingly, the amount of data storage of the RAM 40 can be properly selected depending on the block structure of the flash ROM 50.

Actually, the operation for writing the parallel converted program data from the USB interface circuit 30 to the RAM 40 and the operation for writing the data from the RAM 40 to the flash ROM 50 are carried out in parallel. Thus, a high speed write is realized.

At a step 210, the write to the flash ROM is started and requires a predetermined time. At the step 209, the microcomputer 10 is set into a NACK state on a software basis. This is a kind of handshake packet of the USB packet and is returned to the personal computer 100 in order to give a notice that data transmitted from the personal computer 100 being the host cannot be accepted.

At a step 212, it is decided whether or not the write is ended or not. If the result of the decision is NO, the NACK state is maintained. If the result of the decision is YES, an ACK state is set. ACK is returned to the personal computer 100 in order to give a notice that the data can be accepted on the microcomputer 10 side.

At a next step 214, subsequently, it is decided whether or not the write of the program data to the flash ROM 50 is completely ended. If the result of the decision is NO, the processing returns to the step 207 and the write of residual program data is continuously carried out. The write of the program data is carried out in a unit of a block (page) (for example, 128 bytes). Therefore, the processing is repeated until all pages are written.

If the result of the decision is YES, the value of the program counter 60 jumps to the address (0000) to be the starting address of the second program area.

At a step 215, then, the microcomputer 10 reads the program data supplied from the personal computer 100 and the CPU 70 starts to execute the operation of the microcomputer 10 based on a decoded program instruction.

According to the invention, it is possible to provide a microcomputer capable of reliably receiving communication data even in the case in which a host personal computer knows that the microcomputer is connected to a USB cable and transmits the communication data immediately after the issuance of a bus reset signal.

What is claimed is:

1. A microcomputer comprising a USB interface circuit for interfacing transmission and receipt of data between a host and the microcomputer through a USB signal line, comprising state setting means for setting the USB signal line to a level in a non-connection state for a period before the USB interface circuit can respond to a bus reset signal sent from the host.

2. A microcomputer according to claim 1, wherein the state setting means includes an output terminal to be also used as a terminal to which the USB signal line is connected, a reset signal generating circuit for generating a reset signal upon receipt of power supply from the USB signal line, and a first oscillator for starting oscillation immediately in response to the reset signal, and operates the microcomputer by using an output of the first oscillator as a system clock and sets a level of the output terminal, thereby forcibly setting the USB signal line to a level in a non-connection state.

3. A microcomputer according to claim 2, further comprising a second oscillator serving to start oscillation in response to the reset signal and having a stabler oscillation frequency and a longer oscillation starting time than those of the first oscillator, and a selecting circuit for selecting one output from the first and second oscillators and feeding the selected output for a system clock, wherein the selecting circuit selects the output of the first oscillator in response to the reset signal and selects the output of the second oscillator after an oscillation state of the second oscillator is stabilized.

4. A microcomputer according to claim 3, further comprising an adding circuit for inputting the reset signal and a delay reset signal obtained by delaying the reset signal, wherein the selecting circuit selects one output from the first oscillator and the output of the second oscillator in response to an output of the adding circuit.

5. A microcomputer according to claim 2, wherein the first oscillator is an RC oscillator.

6. A microcomputer according to claim 3, wherein the first oscillator is an RC oscillator.

7. A microcomputer according to claim 4, wherein the first oscillator is an RC oscillator.

8. A microcomputer according to claim 3, wherein the second oscillator is a quartz oscillator.

9. A microcomputer according to claim 4, wherein the second oscillator is a quartz oscillator.

10. A microcomputer according to claim 6, wherein the second oscillator is a quartz oscillator.

11. A microcomputer according to claim 7, wherein the second oscillator is a quartz oscillator.

* * * * *